US010996951B2

(12) United States Patent
Figuli et al.

(10) Patent No.: US 10,996,951 B2
(45) Date of Patent: May 4, 2021

(54) PLAUSIBILITY-DRIVEN FAULT DETECTION IN STRING TERMINATION LOGIC FOR FAST EXACT SUBSTRING MATCH

(71) Applicant: INTERNATIONAL BUSINESS MACHINES CORPORATION, Armonk, NY (US)

(72) Inventors: Razvan Peter Figuli, Remchingen (DE); Stefan Payer, Stuttgart (DE); Petra Leber, Ehningen (DE); Cedric Lichtenau, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,356

(22) Filed: Sep. 11, 2019

(65) Prior Publication Data

US 2021/0072989 A1    Mar. 11, 2021

(51) Int. Cl.
 *G06F 9/30* (2018.01)

(52) U.S. Cl.
 CPC ...... *G06F 9/30145* (2013.01); *G06F 9/30018* (2013.01); *G06F 9/30036* (2013.01); *G06F 9/30098* (2013.01)

(58) Field of Classification Search
 CPC .................................. G06F 9/30145
 See application file for complete search history.

(56) References Cited

U.S. PATENT DOCUMENTS

| 4,162,482 A | 7/1979 | Su |
| 4,907,194 A | 3/1990 | Yamada et al. |
| 5,225,833 A * | 7/1993 | Fisher ...................... G09G 5/30 |
| | | 341/106 |

(Continued)

FOREIGN PATENT DOCUMENTS

| CN | 101609455 A | 12/2009 |
| EP | 2680166 B1 | 10/2015 |
| WO | 2007076269 A2 | 7/2007 |

OTHER PUBLICATIONS

Transmittal Form PTO/SB/21, signed Mar. 17, 2020.

(Continued)

*Primary Examiner* — Joseph D Torres
(74) *Attorney, Agent, or Firm* — Cantor Colburn LLP; William Kinnaman

(57) ABSTRACT

A method for detecting faults in substring search operations using a processor unit including vector registers of M vector elements each. A non-limiting example of the method includes providing an M×M matrix of comparators for characterwise comparison of the elements of a reference string and a target string. A first zero detect vector having value indicative of terminating element of the target string and a second zero detect vector having a value indicative of terminating element of the reference string are generated. A resulting bit vector is generated using comparison performed by the M×M matrix. The resulting bit vector indicates characters of the target string that fully match the reference string and indicate characters of the target string that partially match the reference string. Fault detection in the (Continued)

substring search operations is performed by comparing the generated zero detect vectors with operands.

20 Claims, 5 Drawing Sheets

(56) References Cited

U.S. PATENT DOCUMENTS

| | | | |
|---|---|---|---|
| 5,586,288 | A | 12/1996 | Dahlberg |
| 7,444,326 | B1 | 10/2008 | Jagadish |
| 7,596,553 | B2 | 9/2009 | Meirovitz |
| 7,756,847 | B2 | 7/2010 | Pauws |
| 7,872,890 | B1 | 1/2011 | Starovoytov |
| 7,991,987 | B2 | 8/2011 | Cabot |
| 8,051,085 | B1 | 11/2011 | Srinivasan |
| 8,296,279 | B1 | 12/2012 | Singh |
| 8,407,245 | B2 | 3/2013 | Ryan |
| 8,620,968 | B2 | 12/2013 | Atasu |
| 8,954,484 | B2 | 2/2015 | Long |
| 9,424,031 | B2 | 8/2016 | Thantry |
| 9,460,196 | B2 | 10/2016 | Boyce |
| 10,169,451 | B1 | 1/2019 | Payer et al. |
| 2003/0137437 | A1 | 7/2003 | Watson |
| 2004/0010752 | A1 | 1/2004 | Chan et al. |
| 2007/0011734 | A1 | 1/2007 | Balakrishnan et al. |
| 2007/0133593 | A1* | 6/2007 | Shankara .............. H04L 45/00 370/463 |
| 2008/0040345 | A1 | 2/2008 | Cameron |
| 2008/0050469 | A1 | 2/2008 | Kwon |
| 2008/0208850 | A1 | 8/2008 | Boyce |
| 2010/0142813 | A1 | 6/2010 | Abdo |
| 2010/0225506 | A1 | 9/2010 | Chen et al. |
| 2010/0318773 | A1 | 12/2010 | Greyzck |
| 2011/0252046 | A1 | 10/2011 | Szabo |
| 2013/0086096 | A1 | 4/2013 | Indeck |
| 2014/0095834 | A1 | 4/2014 | Kuo |
| 2015/0199178 | A1 | 7/2015 | Shi et al. |
| 2016/0224552 | A1 | 8/2016 | Han |
| 2017/0011120 | A1 | 1/2017 | Cheung et al. |
| 2017/0024439 | A1 | 1/2017 | Chavan |
| 2017/0077964 | A1 | 3/2017 | Guilford et al. |
| 2017/0185465 | A1 | 6/2017 | Ould-Ahmed-Vall et al. |
| 2018/0004513 | A1 | 1/2018 | Plotnikov |
| 2018/0189675 | A1 | 7/2018 | Nurvitadhi |
| 2018/0314722 | A1 | 11/2018 | Li et al. |
| 2019/0325083 | A1 | 10/2019 | Payer |
| 2020/0210181 | A1 | 7/2020 | Ould-Ahmed-Vall |
| 2020/0264890 | A1* | 8/2020 | Lichtenau ............. G06F 9/3826 |

OTHER PUBLICATIONS

Abdeen, R., "Start-to-End Algorithm for String Searching", IJCSNS International Journal of Computer Science and Network Security, vol. 11 No. 2, Feb. 2011, pp. 179-182.

Boyer et al., "A Fast String Searching Algorithm", Communications of the ACM, Oct. 1977, vol. 20, No. 10, pp. 762-772.

Faro et al., "Fast Packed String Matching for Short Patterns", 2013 Proceedings of the Fifteenth Workshop on Algorithm Engineering and Experiments, pp. 113-121.

Figuli et al., "Non-Overlapping Substring Detection Within a Data Element String", U.S. Appl. No. 16/109,840, filed Aug. 23, 2018.

Figuli et al., "Plausability-Driven Fault Detection in Result Logic and Condition Codes for Fast Exact Substring Match", U.S. Appl. No. 16/567,398, filed Sep. 11, 2019.

Figuli et al., "Rapid Substring Detection Within a Data Element String", U.S. Appl. No. 16/109,836, filed Aug. 23, 2018.

Franek et al., "A simple fast hybrid pattern-matching algorithm", Journal of Discrete Algorithms 5 (2007), Available online Jan. 16, 2007, pp. 682-695.

IBM "List of IBM Patents or Patent Applications Treated as Related", Nov. 11, 2019, 2 pages.

Indyk, P., "Faster algorithms for string matching problems: matching the convolution bound", 39th Annual Symposium on Foundations of Computer Science, Nov. 8-11, 1998, 8 pages.

Intel, "Intel 64 and IA-32 Architectures Optimization Reference Manual", Order No. 248966-033, Jun. 2016, 672 pages.

Intel, "Intel SSE4 Programming Reference", Reference No. D91561-003, Jul. 2007, 197 pages.

Karp et al., "Efficient randomized pattern-matching algorithms", IBM Journal Res. Develop., vol. 31, No. 2, Mar. 1987, pp. 249-260.

Knuth et al., "Fast Pattern Matching in Strings", Siam J. Comput., vol. 6, No. 2, Jun. 1977, 28 pages.

Lau, K., "Swift Algorithm Club: Boyer Moore String Search Algorithm", raywenderlich.com, Jun. 30, 2017, 8 pages.

Lin et al., "Non-Overlapping Subsequence Matching of Stream Synopses", IEEE Transactions on Knowledge and Data Engineering, vol. 30, No. 1, Jan. 2018, pp. 101-114.

Mula, W., "SIMD-friendly algorithms for substring searching", Nov. 28, 2016, Updated on Apr. 29, 2017, 16 pages.

Myers, G., "A Fast Bit-Vector Algorithm for Approximate String Matching Based on Dynamic Programming", Journal of the ACM, vol. 46, No. 3, May 1999, pp. 395-415.

ROSETTACODE.org, "Count Occurrences of a Substring", retrieved from: https://www.rosettacode.org/wiki/Count_occurrences_of_a_substring; last modified Jan. 14, 2018, printed Mar. 8, 2018, 60 pages.

Sitaridi et al., "SIMD-Accelerated Regular Expression Matching", DaMoN '16, Jun. 26, 2016, ACM, pp. 1-7.

Unknown, "charmatch: Partial String Matching", retrieved from: https://rdrr.io/r/base/charmatch.html; Sep. 22, 2017, 26 pages.

Unknown, "Java String indexOf Parsing", CodingBat code practice, Code Help and Videos, retrieved from: http://codingbat.com/doc/java-string-indexof-parsing.html; Sep. 22, 2017, 3 pages.

Zhang et al., "Fast String Matching With Overlapped Substring Classifier in Deep Packet Inspection Systems", 2010 IEEE Global Telecommunications Conference, Dec. 6-10, 2010, 6 pages.

* cited by examiner

PLAUSIBILITY-DRIVEN FAULT DETECTION IN STRING TERMINATION LOGIC FOR FAST EXACT SUBSTRING MATCH

BACKGROUND

The present invention relates to the field of digital computer systems, and more specifically, to plausibility-driven fault detection in string termination logic for fast exact substring match using a processor unit for substring searching.

Digital text representations are encoded and stored as strings of binary encoded characters. Widely accepted character encoding standards for computers include American Standard Code for Information Interchange (ASCII) and Unicode Transformation Format (UTF). One of the most common text processing tasks on computers is the substring search or substring match to identify the occurrences of a reference string of characters within a larger target string of characters.

SUMMARY

Embodiments of the present invention are directed to a method for detecting faults in substring search operations using a processor unit comprising vector registers of M vector elements each. A vector element is an n-bit element for encoding a character. A non-limiting example of the method includes providing an M×M matrix of comparators for characterwise comparison of the elements of a reference string and a target string. A first zero detect vector having value indicative of terminating element of the target string and a second zero detect vector having a value indicative of terminating element of the reference string are generated. A resulting bit vector is generated using comparison performed by the M×M matrix. The resulting bit vector indicates characters of the target string that fully match the reference string and indicate characters of the target string that partially match the reference string. Fault detection in the substring search operations is performed by comparing at least one generated zero detect vector with at least one operand.

Embodiments of the present invention are directed to a processor unit for detecting faults in sub string search operations. The processor unit includes vector registers of M vector elements each. A vector element is an n-bit element for encoding a character. A non-limiting example of the processor includes an M×M matrix of comparators for characterwise comparison of elements of a first register storing a reference string and elements of a second register of the registers storing a target string. The M×M matrix is configured to generate a bit vector indicating at least one of characters of the target string that fully match the reference string and characters of the target string that partially match the reference string. The processor also includes a zero detect logic for generating a first zero detect vector having value indicative of terminating element of the target string and for generating a second zero detect vector having value indicative of terminating element of the reference string. The processor further includes a result generating logic for generating using the resulting bit vector an indication of a substring of the target string that matches a part of the string, wherein the indication is of the beginning of the substring and the length of the substring. The processor also includes a fault detection logic for performing fault detection in the substring search operations by comparing at least one generated zero detect vector with at least one operand.

Embodiments of the invention are directed to a computer-program product for detecting faults in sub string search operations using a processor unit comprising vector registers of M vector elements each A vector element is an n-bit element for encoding a character. The computer-program product including a computer-readable storage medium having program instructions embodied therewith. The program instructions are executable by a processor to cause the processor to perform a method. A non-limiting example of the method includes providing an M×M matrix of comparators for characterwise comparison of the elements of a reference string and a target string. A first zero detect vector having value indicative of terminating element of the target string and a second zero detect vector having a value indicative of terminating element of the reference string are generated. A resulting bit vector is generated using comparison performed by the M×M matrix. The resulting bit vector indicates characters of the target string that fully match the reference string and indicate characters of the target string that partially match the reference string. Fault detection in the substring search operations is performed by comparing at least one generated zero detect vector with at least one operand.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
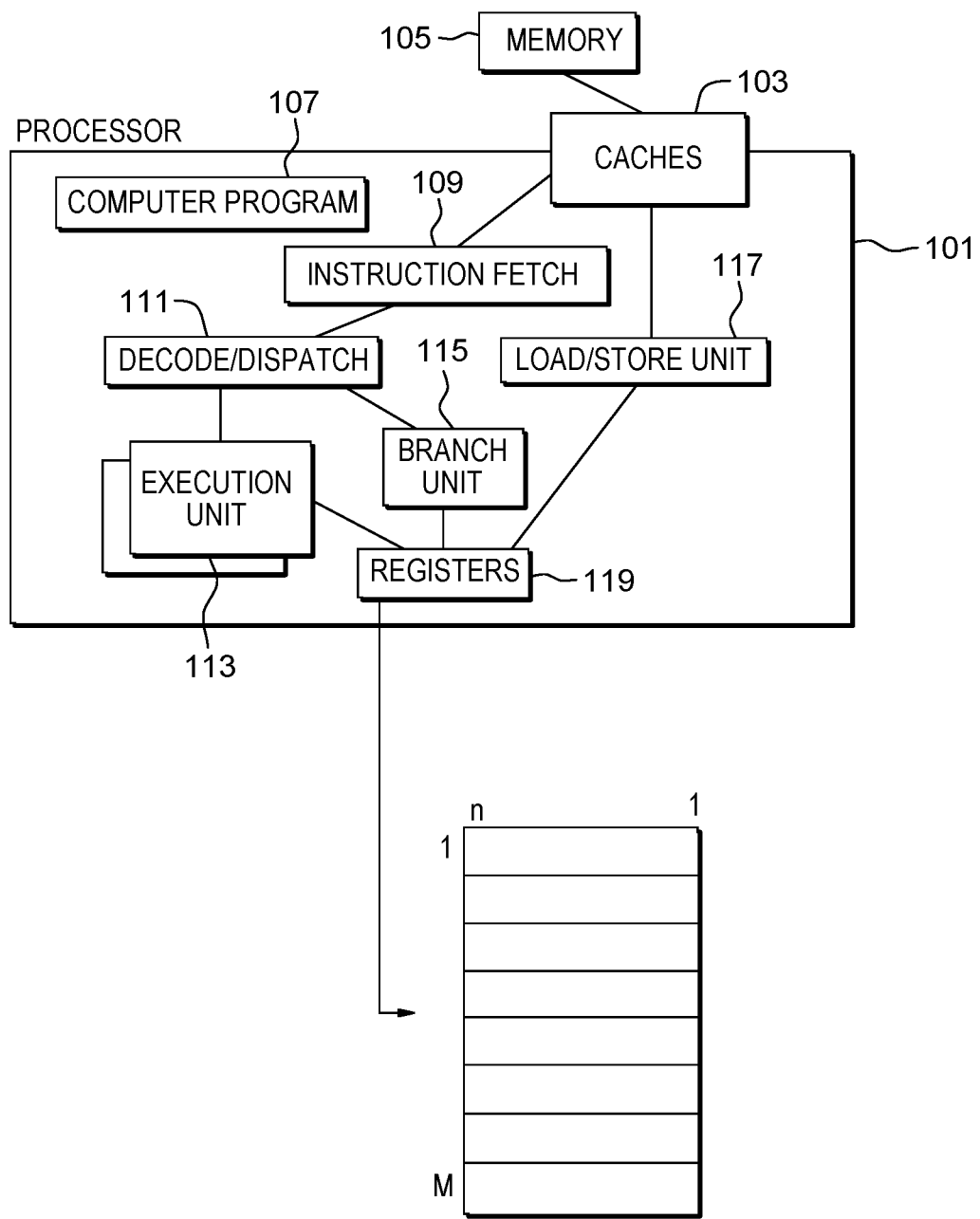
FIG. 1 is an exemplary structure of a processor, in accordance with embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

As described previously, one of the most common text processing tasks on computers is the sub string search or substring match to identify the occurrences of a reference string of characters within a larger target string of characters. A target string can be generated, for example, based on speech input using a speech transcription process. Generally, the length of the reference string can be specified either implicitly (by zero-termination) or explicitly by an extra operand. Similarly, the target string can be limited by zero termination marking the end of string (EOS). With the ever-increasing pool of information, especially non-structured human readable information, there is a need for faster extraction of textual information and consequently faster methods for solving the substring match problem. Furthermore, there is a need for additional logic that performs cross-checking on internal signals and intermediate results for plausibility.

Vector SIMD (Single Instruction Multiple Data) engines with dedicated instructions for substring search allow the comparison of several characters at the same time with a single instruction, which brings a speed-up in contrast to byte-by-byte comparison. In an exemplary vector SIMD implementation, a vector register has a fixed number of bits (e.g., K bits) that may hold a single vector. The vector register may comprise M vector elements having a respective size of n (i.e., each vector element occupies n bits). The vector register comprises M vector elements of size n. The width of a register refers to the number of vector elements in the register.

The number of characters L is smaller than M. Embodiments of the present invention involve a substring search of the L characters in a target string that may occupy a full vector register (e.g., of M×n bits). The string of L characters may be referred to as a reference string.

The upper triangular part of the comparator matrix comprises the main diagonal and subsequent upper diagonals of the matrix. The lower triangular part of the comparator matrix comprises the main diagonal and subsequent lower diagonals of the matrix.

The term "full match" refers to a substring of L characters of the target string that fully match the reference string. The term "partial match" refers to a substring of one or more characters of the target string that partially match the reference string. Using the upper diagonals may enable identification of the substring of one or more characters at the end of the target string. Using the lower diagonals may enable the identification of the substring of one or more characters at the beginning of the target string.

One or more embodiments of the fast-exact substring match described herein enable exact identification of both, full matches anywhere in the target string and partial match at the end or beginning of the target string. This method does not require re-evaluation (e.g., the substring matching in short strings with contemporary known instructions may require a reevaluation that involves an additional shifting of the operand to be searched in order to find a partial match).

For short strings that fit within a vector register, the fast-exact substring match method described herein enables the identification of a substring match with a single operation. This eliminates the re-evaluation phase, when either a full match or a partial match occurs.

Many processor designs, especially when targeted for servers or mainframes, need also to address and incorporate the aspects of RAS (reliability, availability and serviceability). For example, in this context, it may be important to detect and handle physical faults (permanent, transient, intermittent) during runtime.

An error is defined as a deviation from accuracy or correctness which is the manifestation of a fault. To miss capturing the serial data bits by a memory cell because of delay fault or to generate an unexpected value as a result of missing the priority of operators are both error examples.

Similar to faults, an error can be categorized into two types: detected or latent errors. When applying error detection techniques; an error is called a latent error, as long as it has not been recognized. As an example, an error in a single memory bit of a cache entry caused by positive charge and kinetic energy of alpha particles, known as a Single Event Upset (SEU) fault, can be either latent or detected. If the processor recognizes the SEU fault, it is detected; otherwise it keeps its latent status. In addition, a latent error may disappear or be overwritten before it is detected. But, most often many of the errors are propagated and consequently generate more errors or pass through the system which result in single or more failures. A SEU can cause a change of state if it occurs in a latch or flip-flop. The impact of a SEU can be significant as the result of substring search usually affects control flow (condition in if clause). As a non-limiting example, a false positive in a database search due to a SEU can lead to wrong allocation or transfer of resources, assets, and the like.

It will be appreciated that conventional fault detection techniques have numerous limitations in the context of string search engines for SIMD. One conventional technique, duplication of resources is prohibitively expensive with the SIMD architecture. Another fault prevention technique, commercial radiation-hardened processors, is also very expensive both in terms of required area and computing power. Yet other fault detection techniques apply to some operations but not others. For example, residue checking technique works only for numeric computations, while parity determination is limited to single or odd bit errors and protects only data but not computations.

Embodiments of the present invention provide logic that enables plausibility-driven cross-checking on internal signals and intermediate results. By contrast to conventional fault detection techniques, the method presented herein focuses primarily on error detection in the result and condition code logic of SIMD substring search engines.

FIG. 1 is an exemplary structure of a processor 101. For example, one or more levels of cache 103 are employed to buffer memory data in order to improve processor performance. The cache 103 is a high-speed buffer holding cache lines of memory data that are likely to be used. Typical cache lines are 64, 128 or 256 bytes of memory data. Cache 103 is caching data of higher hierarchical storage being main memory storage 105.

A program counter (instruction counter) 107 keeps track of the address of the current instruction to be executed. A program counter in a z/Architecture processor is 64 bits and can be truncated to 31 or 24 bits to support prior addressing limits. A program counter may typically be embodied in a program status word (PSW) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. The program counter 107 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 107.

Typically, an instruction fetch unit 109 is employed to fetch instructions on behalf of the processor 101. The fetch unit 109 either fetches "next sequential instructions", target instructions of branch taken instructions, or first instructions of a program following a context switch. Examples of instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 101. For example, the fetched instruction(s) are passed to a dispatch unit 111 of the fetch unit. The dispatch unit 111 decodes the instruction(s) and forwards information about the decoded instruction(s) to appropriate units 113, 115, 117. An execution unit 113 may typically receive information about decoded arithmetic instructions from the instruction fetch unit 109 and may perform arithmetic operations on operands according to the opcode of the instruction. Operands are provided to the execution unit 113 preferably either from memory 105, vector registers 119 or from an immediate field of the instruction being executed. Results of the execution, when stored, are stored either in memory 105, vector registers 119 or in other machine hardware (such as control registers, PSW registers and the like).

As shown in FIG. 1, vector registers 119 may have a same size, K, where K=M×n and n is the number of bits that encodes a single character (e.g. n=8 bits). For example, each of the vector registers 119 may store K bits. M may be the width of the register.

The data stored in the vector registers 119 may for example be processed using a parallel vector processing technique, e.g., using Single Instruction Multiple Data (SIMD) hardware, e.g., vector registers 119 may hold data for vector processing done by SIMD instructions.

For example, fixed-sized chunks of bytes known as words may be transferred from the memory 105 to the vector register 119. The number of bits in a word may, for example, be equal or smaller than the size K of the register 119. For example, vector load/store instructions provide the ability to take the words stored in memory 105 and pack them into sequential vectors/streams to be placed in vector registers 119. For example, the memory 105 may be configured to comprise 256-bit memory words. A 256-bit memory word may be partitioned into chunks of K bits. During processing, each K-bit chunk (containing M characters) is loaded into a register 119.

Figure 2:
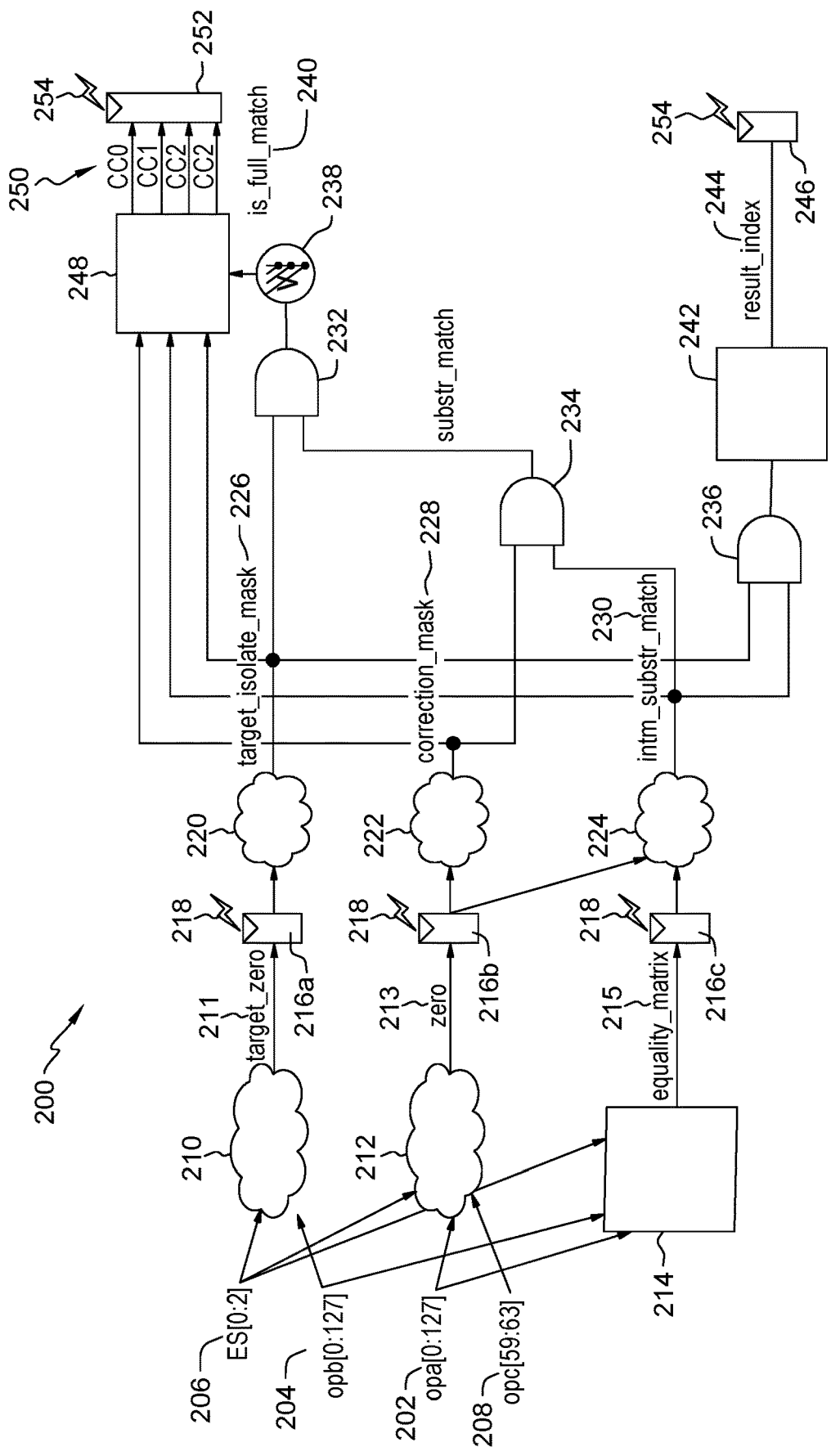
FIG. 2 is a diagram illustrating components of a processing unit in accordance with embodiments of the present invention.

FIG. 2 is a diagram illustrating components of a processing unit 200 in accordance with one or more embodiments of the present invention. The processing unit 200 may be configured to operate on an entire vector in one instruction. The processing unit 200 may be part of the execution units 113 of FIG. 1.

The processing unit 200 comprises a comparator matrix 214. The comparator matrix 214 may be a hardware comparator matrix. The comparator matrix 214 may be configured to compare individual characters. The comparator matrix 214 comprises comparators, such as character-wise equality comparators. In addition to or alternative to the equality comparison, the comparators may be configured to perform a combination of '>' and '<' operators e.g. operation: NOT((r>t) OR (r<t))=(r==t).

The comparator matrix 214 may operate on two operands a and b. Operand a 202 may, for example, be a reference string to be searched, operand b 204 may be a target string that is checked if it contains all and/or part of the operand a 202. The reference string may comprise L characters and the target string may comprise M characters which may occupy a full vector register 119. The target and reference strings are compared character-by-character (character-wise). A third operand, operand c 208, is utilized by a zero detect logic 212 to generate a zero detect vector which is applied by logic 224 on the result of the comparator matrix 214. The operand c (explicit length) 208 may have, for instance, five bits, 59-63. For instance, the search of a reference string "noon" within a target string "abhighnoonoonnoo" with explicit length of the reference string equal to 4 (c=4) returns result=0000001001000100. The '1's in the seventh and tenth bits from left originate from a full match, yet the '1' in the third bit from the right originates from a partial match.

An element size control 206 having, for instance, three bits, 0-2, specifies an element size. The element size control 206 specifies the size of the elements in the vector register operands. In one example, the element size control 206 can specify a byte, halfword (e.g., 2 bytes) or word (e.g., 4 bytes). For instance, a 0 indicates a byte; a 1 indicates a halfword; and a 2 indicates a word, a.k.a., full word. Each element can contain the encoded data within a stream of UTF-8 (one byte/character), UTF-16 (2 bytes/character) or UTF-32 (4 bytes/character) code units.

Since the vectors register's width, M=16, is higher than the number L=4 of characters of the reference string "noon", the vector register that stores the reference string may comprise empty elements. For instance, the first 4 characters in the reference string 202 may represent the word "noon", yet the trailing 12 characters are empty and may be represented by 0x00 in the character encoding. A first zero detect logic 210 and a second zero detect logic 212 may be configured for generating a first zero detect vector 211 and a second detect vector 213, respectively. The first zero detect vector 211 has values indicative of empty elements of the target string and the non-empty elements of the target string and the second zero detect vector 213 has values indicative of empty elements of the reference string and the non-empty elements of the reference string.

In one embodiment, an output of the comparator matrix 214 may comprise an equality matrix 215. The equality matrix 215 has values indicative of the equality relationship between the compared characters. As shown in FIG. 2, the first zero detect vector 211, the second detect vector 213 and the equality matrix 215 may be inputted into corresponding flip-flops 216a, 216b and 216c, respectively.

According to an embodiment of the present invention, the processing unit 200 may further include correction logic. Correction logic comprises a register for storing an intermediate result vector 230, a register comprising a correction mask 228, a register comprising a target isolation mask 226 and a logic for performing AND operations between corresponding elements of the registers. In one example, the three registers may not be part of the correction logic. Utilization of the correction mask 228 may enable a simplified method for suppressing the indication of the partial match or the indication of the full match in an intermediate result vector 230. In contrast to the conventional art, the processing unit 200 distinguishes between full match and partial match at the hardware level. This may be achieved by applying the correction mask 228 on the anticipated intermediate result vector 230 that may contain a partial match at the end of a string fragment. The anticipated intermediate result vector 230 cannot distinguish between full match and partial match. For example, if the operand b comprises operand a and part of operand a, the intermediate result vector 230 comprises a bit value at a bit position that marks the beginning of a sub string of the operand b that fully matches the operand a and another bit value at another bit position marking the beginning of a substring of the operand b that partially matches the operand a.

The correction logic may also include a first AND gate 234 for performing an AND operation between the correction mask 228 and the intermediate result vector 230. The output of the AND gate 234 may be used as an input to a second AND gate 232. The target isolation mask 226 may be used as another input to the second AND gate 232. The correction logic may further include a third AND gate 236 for performing an AND operation between the intermediate result vector 230 and the target isolation mask 226.

According to an embodiment of the present invention, a result generating logic may be realized, for instance, by an or-tree 238 over the bits of the output of the second AND gate 232. An output of the or-tree 238 provides an indication of the full match results 240. As noted herein, the full match refers to a substring of L characters of the target string that fully match the string. The output of the third AND gate 236 is fed to a leading zero counter 242. The leading zero counter 242 returns a result index 244 by determining the number of leading zeros in a resulting bit vector. The result index 244 indicates index of a first match. Thus, for example, the search of a reference string "noon" within a target string "abhighnoonoonnoo" returns result index value equal to 6 (since, 6$^{th}$ bit of the target string is the first match). The result index 244 may be stored in a flip-flop 246.

According to an embodiment of the present invention, the result generating logic may further return condition code 250 along with the result index 244. Exemplary condition codes are illustrated in the following table:

| Condition Code | Meaning |
| --- | --- |
| CC0 | No match, no partial match, no end-of-string (EOS) |
| CC1 | No match, no partial match but explicit EOS termination |
| CC2 | Full match was found |
| CC3 | Partial match was found but no full match |

In one embodiment, the condition code 250 may be generated by a condition code generator 248 based on a combination of the following inputs: the target isolation mask 226, the correction mask 228 and the anticipated intermediate result based on the indication of the full match results 240. In one embodiment, the condition code generator 248 may comprise a decoder. The generated condition code 250 may be stored in a corresponding flip-flop 252. As shown in FIG. 2, SEU faults 218, 254 may affect any of the correction logic flip-flops 216a, 216b, 216c and any of the result generating logic flip-flops 246, 252.

Figure 3:
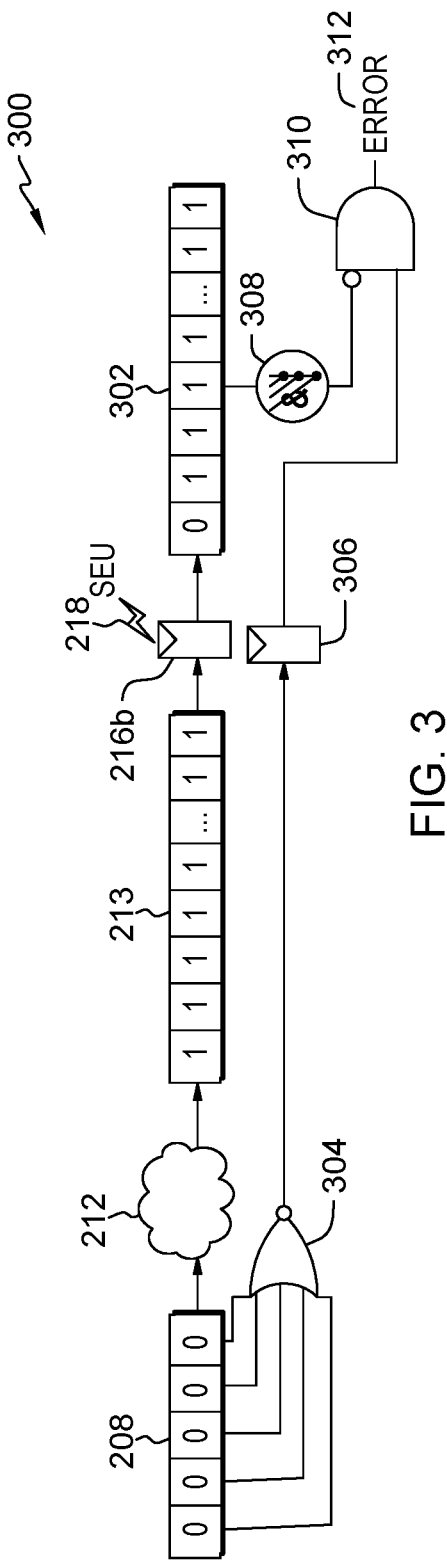
FIG. 3 is a diagram illustrating logic to detect faults when explicit length of a string is 0 and a zero detect vector has at least one bit set to 0, in accordance with embodiments of the present invention.

FIG. 3 is a diagram illustrating a fault detection logic 300 that includes logic to detect faults when explicit length of a string is 0 and a zero detect vector has at least one bit set to 0, in accordance with embodiments of the present invention. A first register 208 shown in FIG. 3 may contain explicit length information associated with a string. According to an embodiment of the present invention, the zero detect logic 212 processes information contained in the explicit length register 208 to generate a zero detect vector 213. In the illustrated case, since the explicit length of the string is 0, all bits of the zero detect vector 213 are set to 1. A flip-flop 216b stores the zero detect vector 213. At some point, the flip-flop 216b may be subject to a SEU event 218 as a result of exposure to radiation consisting of alpha particles or neutrons, for example. As a result, the output 302 of the flip-flop 216b may have at least one of the bits flipped (for example, the first bit).

In order to detect this fault, the fault detection logic 300 includes a NOR gate 304. All bits of the explicit length register 208 are fed into the NOR gate 304. The NOR gate outputs the value 1 if and only if all bits of the explicit length register 208 have a value of 0 and otherwise outputs a value of 0. The fault detection logic 300 further includes a flip-flop 306 for storing the output of the NOR gate 304. As shown in FIG. 3, the output of the NOR gate 304 comprises one of the inputs of an AND gate 310. Another input of the AND gate 310 is the inversed output of an AND tree 308. In this example, the AND tree 308 processes the SEU affected output 302 of the flip-flop 216b It should be noted that the AND tree 308 generates a value of 1 only if all bits of the output 302 are set to 1. In this case, since one of the bits of the output 302 is set to 0, the value generated by the AND tree 308 is 0 which is inverted to 1 at the input of the AND gate 310. Since the second input of the AND gate 310 is also 1, the AND gate 310 outputs 1, indicating a fault. The fault detection logic 300 is configured to check plausibility of termination of strings and to detect faults when the explicit length of a string is 0 and the zero detect vector 213 has at least one bit erroneously set to 0.

Figure 4:
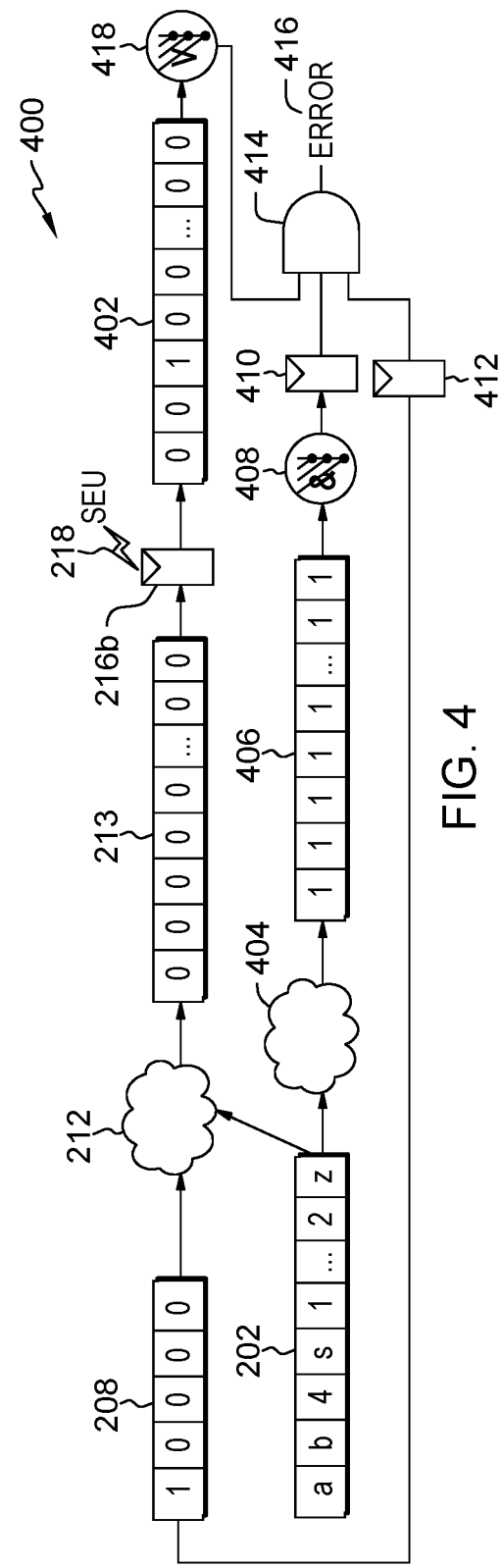
FIG. 4 is a diagram illustrating logic to detect faults when a string has no terminating elements and a zero detect vector has at least one bit set to 1, in accordance with embodiments of the present invention.

FIG. 4 is a diagram illustrating a circuit 400 that includes logic to detect faults when explicit length is the full vector length (in this example 16="10000" in binary representation) and a zero detect vector has at least one bit set to 1, in accordance with embodiments of the present invention. A first register 208 shown in FIG. 4 may contain explicit length information associated with a string. According to an embodiment of the present invention, a zero detect logic 212 processes information contained in the explicit length register 208 and the operand a 202 to generate a zero detect vector 213. In the illustrated case, since the string contained in the operand a 202 is not implicitly terminated (contains no empty characters) and the explicit length of the string is 16, all bits of the zero detect vector 213 are set to 0. A flip-flop 216b stores the zero detect vector 213. At some point, the flip-flop 216b may be subject to a SEU event 218 as a result of exposure to radiation consisting of alpha particles or neutrons, for example. As a result of the occurred SEU event 218, the output 402 of the flip-flop 216b may have at least one of the bits flipped.

In order to detect this fault, the fault detection logic 400 includes a parity generating logic 404 to generate a parity vector 406 corresponding to the string contained in the operand a 202. All bits of the operand a 202 are fed into the parity generating logic 404. The parity vector 406 may be used as a smaller abstract of operand a 202 containing 0 for empty elements due to their even parity. If there are empty elements in the string contained in the operand a 202, at least one element of the parity vector 406 is set to 0, thus indicating that the string is not implicitly terminated. The fault detection logic 400 further includes an AND tree 408 for checking the parity vector 406. In this case, the AND tree 408 generates a value of 1 only if all bits of the parity vector 406 are set to 1. In another embodiment the AND tree 408 is applied directly on the operand a 202 for a higher accuracy of the error detect logic at the costs of larger area requirements and logic delay due to the larger AND-tree needed. The output generated by the AND tree 408 is stored in a first flip-flop 410. As shown in FIG. 4, a second flip-flop 412 stores the most significand bit of the explicit length register 208, thus indicating that the string is not explicitly terminated if that bit is set to 1. The fault detection logic 400 also includes an OR tree 418 for checking the SEU affected output 402 of the flip-flop 216b. In this example, the OR tree 418 generates a value of 1 if at least one bit of the output 402 is set to 1. The output generated by the OR tree 418 is connected to an input of an AND gate 414. The information stored in the flip-flops 410 and 412 is also processed by the AND gate 414. In this case, since one of the bits of the output 402 is set to 1, the value generated by the OR tree 418 is 1. Furthermore, since the other two inputs of the AND gate 414 also contain 1s, the AND gate 414 outputs 1, indicating a fault 416. The fault detection logic 400 is configured to check plausibility of termination of strings and to detect faults when the string is neither explicitly nor implicitly terminated and the zero detect vector 213 has at least one bit erroneously set to 1.

Figure 5:
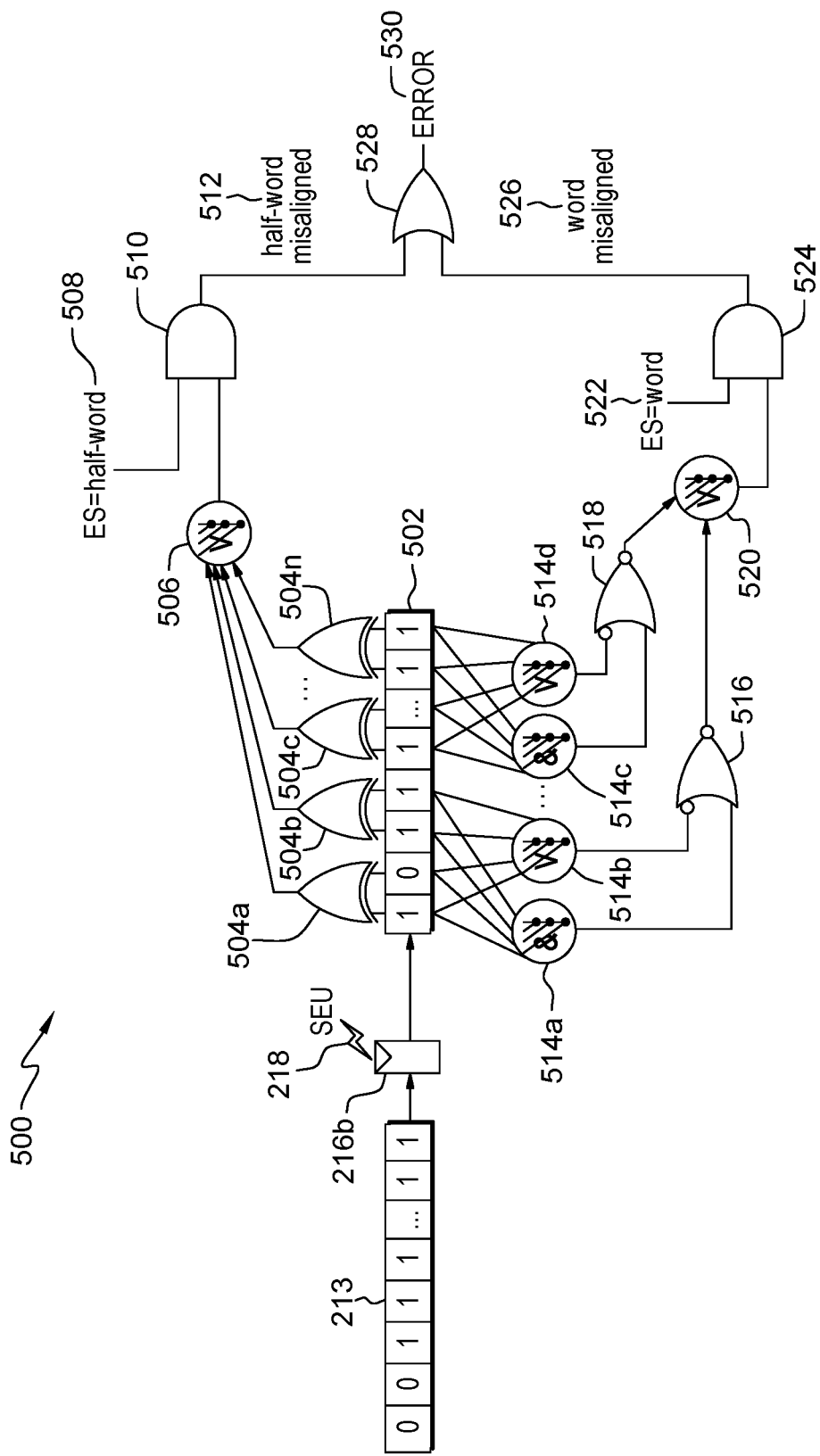
FIG. 5 is a diagram illustrating logic to detect faults when a zero detect vector is not aligned with an element size, in accordance with embodiments of the present invention.

FIG. 5 is a diagram illustrating a misalignment detection logic 500 that includes logic to detect faults when a zero detect vector is not aligned with an element size, in accordance with embodiments of the present invention. For illustrative purposes only, it is assumed that characters are encoded using UTF-16 encoding scheme, which is a non-ASCII transparent byte serialized encoding scheme that may be either big-endian (BE) or little-endian (LE) and, thus, defines the order of the bytes in the encoding scheme. Each character is encoded using 2 bytes. In this example, only first two bytes of an exemplary zero detect vector 213 are set 0, all of the remaining bytes are set to 1. A flip-flop 216b stores the zero detect vector 213. At some point, the flip-flop 216b may be subject to a SEU event 218. A misalignment in the zero detect vector 213 occurs if not all bits associated with the bytes of an element have the same value. For instance, assuming element size is 4 bytes, then the following values of the zero detect vector 213 are well-aligned: "0000_1111_0000_1111" and "1111_1111_0000_1111". Examples of misaligned values of the zero detect vector 213 are illustrated next: "0001_1111_0000_1111", "0100_1111_0000_1111", "1110_1111_0000_1111", and "0011_1111_0000_1111".

In order to detect this misalignment between the zero detect vector 213 and a corresponding element size, a misalignment detection logic 500 includes circuit elements to detect element misalignments having at least word or half-word element sizes. The misalignment detection logic 500 is configured to process output at the flip-flop 216b storing the zero detect vector 213. To process the zero detect vector 213 having half-word elements, the misalignment detection logic 500 includes a plurality of EXOR gates 504a-504n connected to respective pairs of bytes of each half-word. Each pair of bytes is expected to have same values. The combination of outputs of the EXOR gates 504a-504n is further processed by an OR tree 506 and the output of the OR tree 506 is connected to an input of an AND gate 510. Another input of the AND gate 510 is an element size indicator 508. The element size indicator 508 contains value indicating that each element of the zero detect vector 213 is half-word. Output of the AND gate 510 is indicative whether there is any misalignment with respect to elements of the zero detect vector 213 when each element is half-word. In this case since only the first byte, but not the second byte of the first pair of bytes of the output vector 502 is erroneously set to 1, a first EXOR gate 504a outputs 1, while all other EXOR gates 504b-504n produce 0s. Since one of the inputs of the OR tree 506 is set to 1, the output of the OR tree is 1. As a result, the AND gate 510 also produces 1, indicating misalignment 512 of the zero detect vector 213 having half-word elements.

The misalignment detection logic 500 may also include circuit elements to process the output vector 502 when each element of the vector 502 is a word (4 bytes). The misalignment detection logic 500 includes pairs of AND tree 514a and OR tree 514b to process respective bytes of each word. The AND tree 514c and the OR tree 514d process bytes of the last word. The output of the OR tree 514b is connected to an inverted input of a first NOR gate 516. The output of the AND tree 514a is connected to a second input of the NOR gate 516. Similarly, the output of the OR tree 514d is connected to an inverted input of a second NOR gate 518. The output of the AND tree 514c is connected to a second input of the NOR gate 518. This configuration is repeated for each element within the zero detect vector 213. The outputs of all NOR gates 516, . . . , 518 are further processed by another OR tree 520. The output of the OR tree 520 is connected to an input of an AND gate 524. Another input of the AND gate 524 receives an element size indicator 522. The element size indicator 522 contains value indicating that each element of the zero detect vector 213 is a word. Output of the AND gate 524 is indicative whether there is any misalignment with respect to elements of the zero detect vector 213 when each element is a word. In this case, since only the second byte of a first word is erroneously set to 0, a first NOR gate 516 outputs 1, while all other NOR gates 518 produce 0s. Since one of the inputs of the OR tree 520 is set to 1, the output of the OR tree 520 is 1. As a result, the AND gate 524 also produces 1, indicating misalignment 526 of the zero detect vector 213 having word elements. An OR gate 528 compares outputs of respective AND gates 510 and 524 to indicate a corresponding misalignment error 530.

Figure 6:
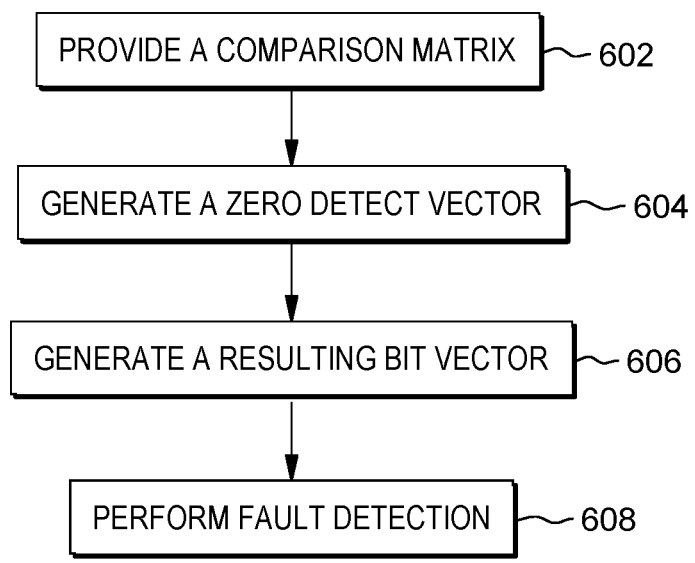
FIG. 6 is a flowchart of a method for detecting faults in sub string search operations, in accordance with embodiments of the present invention.

FIG. 6 is a flowchart of a method for detecting faults in substring search operations, in accordance with embodiments of the present invention using a processor unit 200 comprising vector registers of M vector elements each. A vector element is an n-bit element for encoding a character. The case where L<M indicates that a substring search of the L characters is performed.

In block 602, the reference string may be loaded in a first register of the registers 119, a target string may be loaded in a second register of the registers 119 and a comparison matrix 214 may be provided. The target string may be checked if it contains the full and/or only part of the reference string using the comparison matrix 214.

In block 604, a zero-detect logic is configured for generating a zero detect vector having values indicative of empty elements of the reference string and the non-empty elements of the reference string. The zero-detect logic comprises elements that are associated with the operands of the comparator matrix provided in block 602.

In block 606, a resulting bit vector is generated. The resulting bit vector comprises a bit value at a bit position that marks the beginning of a sub string of the target string that fully matches the string and another bit value at another bit position marking the beginning of a substring of the target string that partially matches the string. The resulting bit vector may contain indication of both, full matches and partial matches that occur at the end of the target string. To generate the resulting bit vector a conjunction of an anticipated intermediate result, which is not capable of distinguishing between full matches and partial matches, with a correction mask that masks out the upper L−1 bits may be performed in order to suppress partial matches from the resulting bit vector.

In block 608, fault detection is performed using the fault detection logic 300, 400 and misalignment detection logic 500 described herein. In accordance with an embodiment of the present invention, the fault detection logic 300 is configured to indicate an error when the explicit length of a string is 0 and a zero detect vector has at least one bit set to 0, in accordance with embodiments of the present invention. In addition, the fault detection logic 400 is configured to indicate an error when the reference string is not terminated and the zero detect vector has at least one bit set to 1. The misalignment detection logic 500 is configured to detect misalignments when a zero detect vector is not aligned with an element size of the string vectors.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting faults in substring search operations, the method comprising:
    providing, using a processor unit comprising vector registers of M vector elements each, an M×M matrix of comparators for characterwise comparison of the elements of a reference string stored in a first one of the vector registers and a target string stored in a second one of the vector registers, wherein a vector element is an n bit element for encoding a character;
    generating a first zero detect vector having a value indicative of a terminating element of the target string and a second zero detect vector having a value indicative of a terminating element of the reference string;
    generating a resulting bit vector using comparison performed by the M×M matrix, the resulting bit vector indicating characters of the target string that fully match the reference string and indicating characters of the target string that partially match the reference string; and
    performing fault detection in the substring search operations by comparing at least one generated zero detect vector with at least one operand.

2. The method of claim 1, wherein generating the resulting bit vector further comprises generating an index of the resulting bit vector for identifying a first match of the reference string within the target string and generating a condition code indicating a type of a detected match.

3. The method of claim 1, wherein the first zero detect vector includes bits corresponding to elements of the target string preceding the terminating element of the target string set to 0 and remaining bits of the first zero detect vector set to 1 and wherein the second zero detect vector includes bits corresponding to elements of the reference string preceding the terminating element of the reference string set to 0 and remaining bits of the second zero detect vector set to 1.

4. The method of claim 3, wherein performing the fault detection further comprises indicating an error if an explicit length of the target string is zero and the first zero detect vector includes at least one bit set to 0 or if an explicit length of the reference string is zero and the second zero detect vector includes at least one bit set to 0.

5. The method of claim 3, wherein performing the fault detection further comprises indicating an error if the target string is not terminated by the terminating element and the first zero detect vector includes at least one bit set to 1 or if the reference string is not terminated by the terminating element and the second zero detect vector includes at least one bit set to 1.

6. The method of claim 3, wherein performing the fault detection further comprises indicating an error if the first zero detect vector or the second zero detect vector is misaligned with a vector element.

7. The method of claim 6, wherein misalignment is detected if bits of the first zero detect vector associated to bytes of an encoded character element of the target string differ from each other or if bits of the second zero detect vector associated to bytes of an encoded character element of the reference string differ from each other.

8. A processor unit for detecting faults in substring search operations, the processor unit comprising:
   a plurality of vector registers of M vector elements each, wherein a vector element is an n-bit element for encoding a character;
   an M×M matrix of comparators for characterwise comparison of elements of a first register storing the reference string and elements of a second register of the registers storing a target string, wherein the M×M matrix is configured to generate a bit vector indicating at least one of characters of the target string that fully match the reference string and characters of the target string that partially match the reference string;
   a first zero detect logic for generating a zero detect vector having value indicative of a terminating element of the target string;
   a second zero detect logic for generating a zero detect vector having value indicative of a terminating element of the reference string;
   a result generating logic for generating using the resulting bit vector an indication of a substring of the target string that matches a part of the reference string, wherein the indication is of the beginning of the substring and the length of the substring; and
   a fault detection logic for performing fault detection in the substring search operations by comparing at least one generated zero detect vector with at least one operand.

9. The processor unit of claim 8, wherein the result generating logic generates an index of the resulting bit vector for identifying a first match of the reference string within the target string and generating a condition code indicating a type of a detected match.

10. The processor unit of claim 8, wherein the first zero detect vector includes bits corresponding to elements of the target string preceding the terminating element of the target string set to 0 and remaining bits of the first zero detect vector set to 1 and wherein the second zero detect vector includes bits corresponding to elements of the reference string preceding the terminating element of the reference string set to 0 and remaining bits of the second zero detect vector set to 1.

11. The processor unit of claim 10, wherein the fault detection logic indicates an error if an explicit length of the target string is zero and the first zero detect vector includes at least one bit set to 0 or if an explicit length of the reference string is zero and the second zero detect vector includes at least one bit set to 0.

12. The processor unit of claim 10, wherein the fault detection logic indicates an error if the target string is not terminated by the terminating element and the zero detect vector includes at least one bit set to 1 or if the reference string is not terminated by the terminating element and the second zero detect vector includes at least one bit set to 1.

13. The processor unit of claim 10, further comprising a misalignment detection logic for detecting misalignment between the first zero detect vector and a vector element and for detecting misalignment between the second zero detect vector and a vector element.

14. The processor unit of claim 13, wherein misalignment is detected if bits of the first zero detect vector associated to bytes of an encoded character element of the target string differ from each other or if bits of the second zero detect vector associated to bytes of an encoded character element of the reference string differ from each other.

15. A computer-program product for detecting faults in sub string search operations, the computer-program product comprising a non-transitory computer-readable storage medium having program instructions embodied therewith, the program instructions executable by a processor to cause the processor to perform a method comprising:
   providing, using a processing unit comprising vector registers of M vector elements each, an M×M matrix of comparators for characterwise comparison of the elements of a reference string stored in a first one of the vector registers and a target string stored in a second one of the vector registers, wherein a vector element is an n-bit element for encoding a character;
   generating a first zero detect vector having a value indicative of a terminating element of the target string and a second zero detect vector having a value indicative of a terminating element of the reference string;
   generating a resulting bit vector using comparison performed by the M×M matrix, the resulting bit vector indicating characters of the target string that fully match the reference string and indicating characters of the target string that partially match the reference string; and
   performing fault detection in the substring search operations by comparing at least one generated zero detect vector with at least one operand.

16. The computer-program product of claim 15, wherein generating the resulting bit vector further comprises generating an index of the resulting bit vector for identifying a first match of the reference string within the target string and generating a condition code indicating a type of a detected match.

17. The computer-program product of claim 15, wherein the first zero detect vector includes bits corresponding to elements of the target string preceding the terminating element of the target string set to 0 and remaining bits of the first zero detect vector set to 1 and wherein the second zero detect vector includes bits corresponding to elements of the reference string preceding the terminating element of the reference string set to 0 and remaining bits of the second zero detect vector set to 1.

18. The computer-program product of claim 17, wherein performing the fault detection further comprises indicating an error if an explicit length of the target string is zero and the first zero detect vector includes at least one bit set to 0 or if an explicit length of the reference string is zero and the second zero detect vector includes at least one bit set to 0.

19. The computer-program product of claim 17, wherein performing the fault detection further comprises indicating an error if the target string is not terminated by the terminating element and the first zero detect vector includes at least one bit set to 1 or if the reference string is not terminated by the terminating element and the second zero detect vector includes at least one bit set to 1.

20. The computer-program product of claim 17, wherein performing the fault detection further comprises indicating an error if the first zero detect vector or the second zero detect vector is misaligned with a vector element.

\* \* \* \* \*